April 16, 1963   L. A. GRAHAM ETAL   3,085,450
TRANSMISSION
Filed Sept. 23, 1960   10 Sheets-Sheet 1
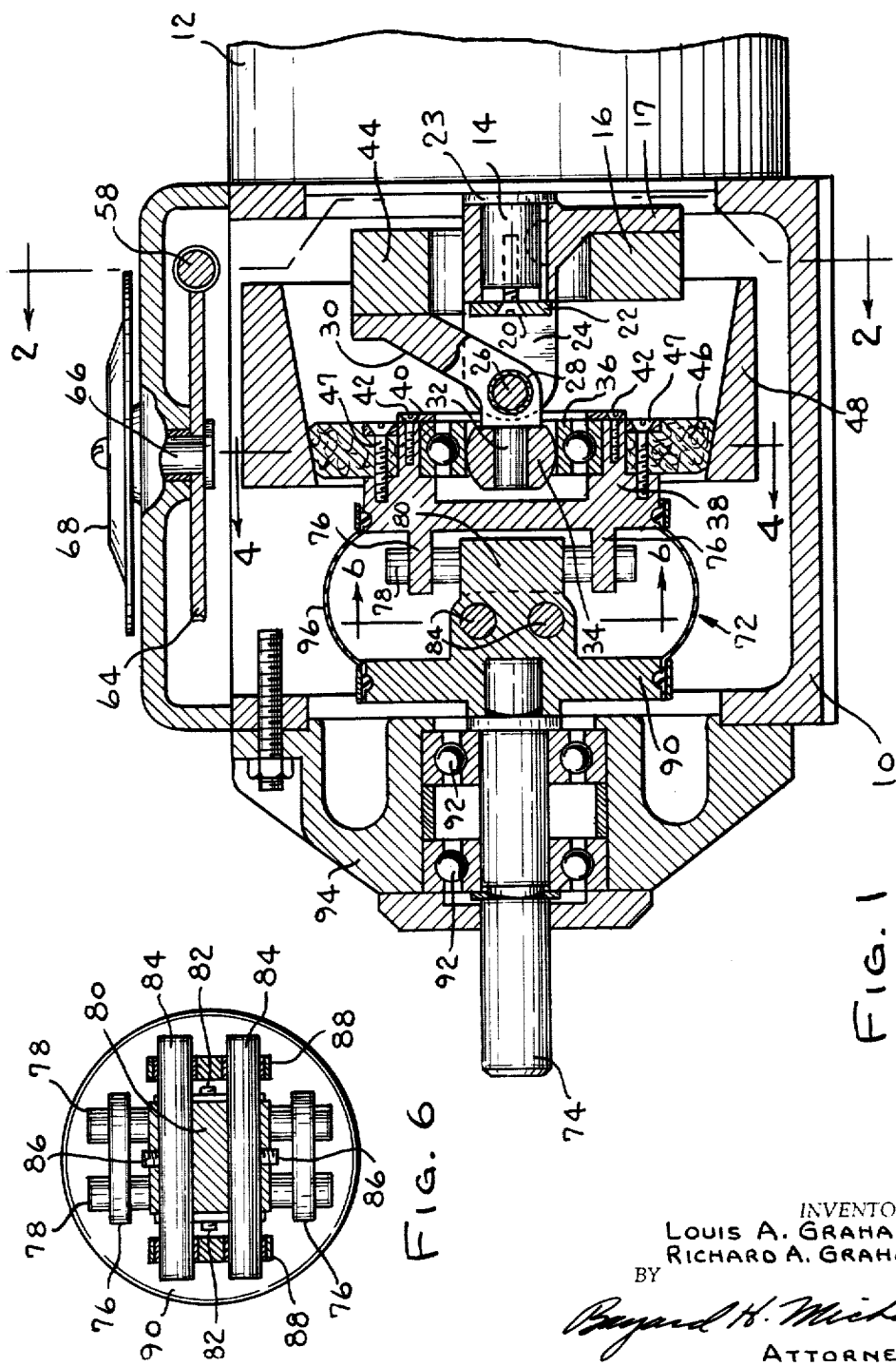
INVENTORS
LOUIS A. GRAHAM
RICHARD A. GRAHAM
BY
Bayard H. Michael
ATTORNEY

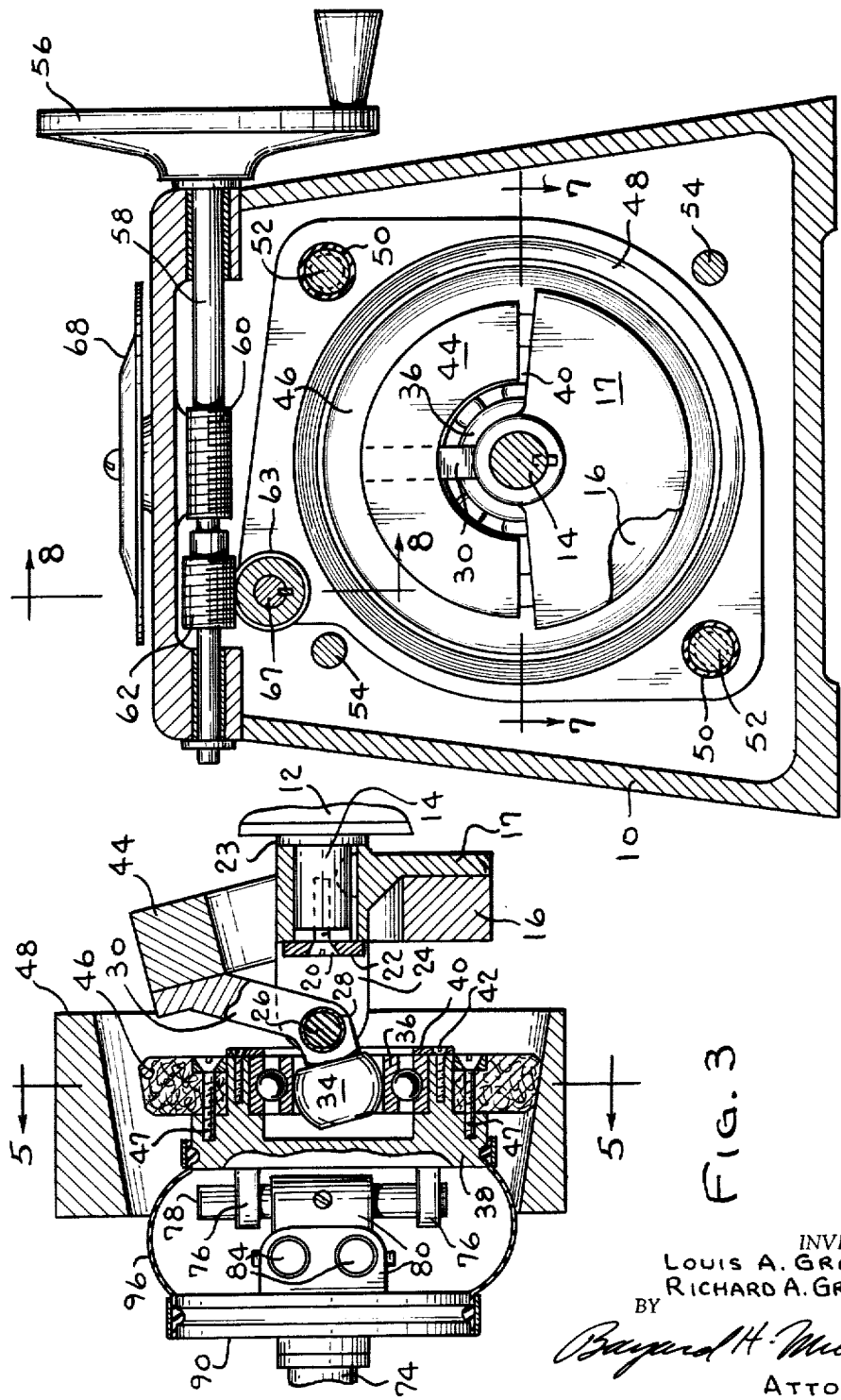

April 16, 1963 L. A. GRAHAM ETAL 3,085,450
TRANSMISSION
Filed Sept. 23, 1960 10 Sheets-Sheet 3
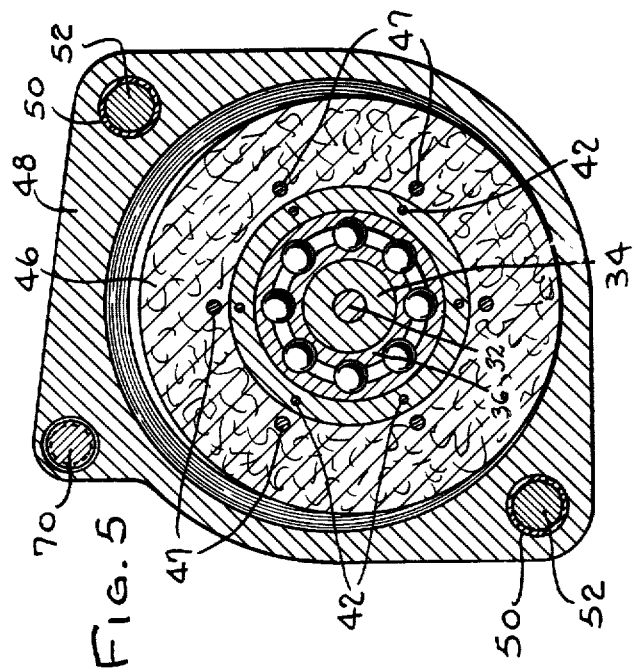
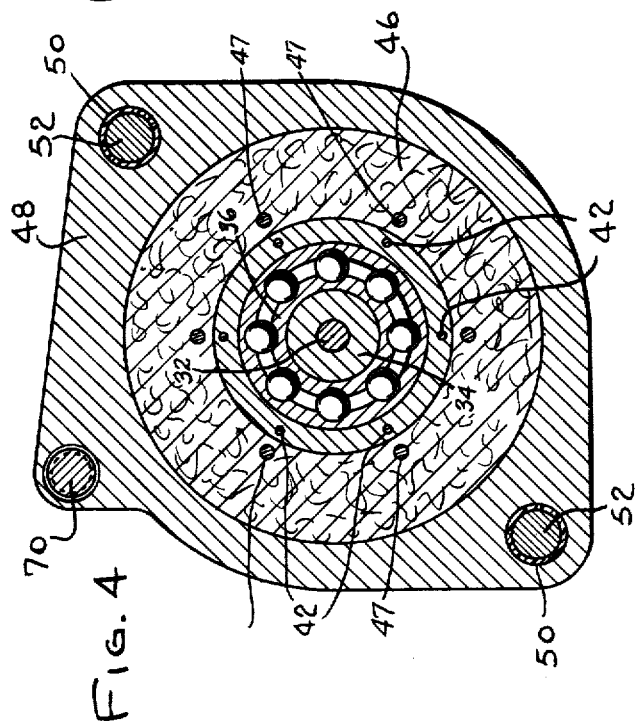
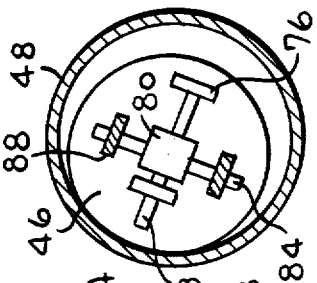
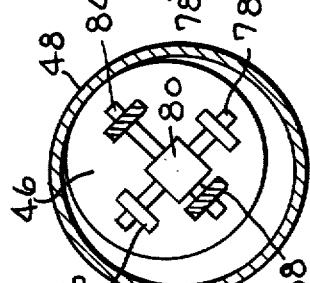
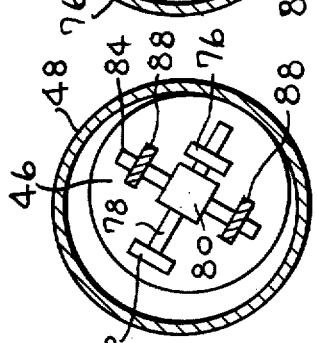
INVENTORS
LOUIS A. GRAHAM
RICHARD A. GRAHAM
BY
Bayard H. Michael
ATTORNEY

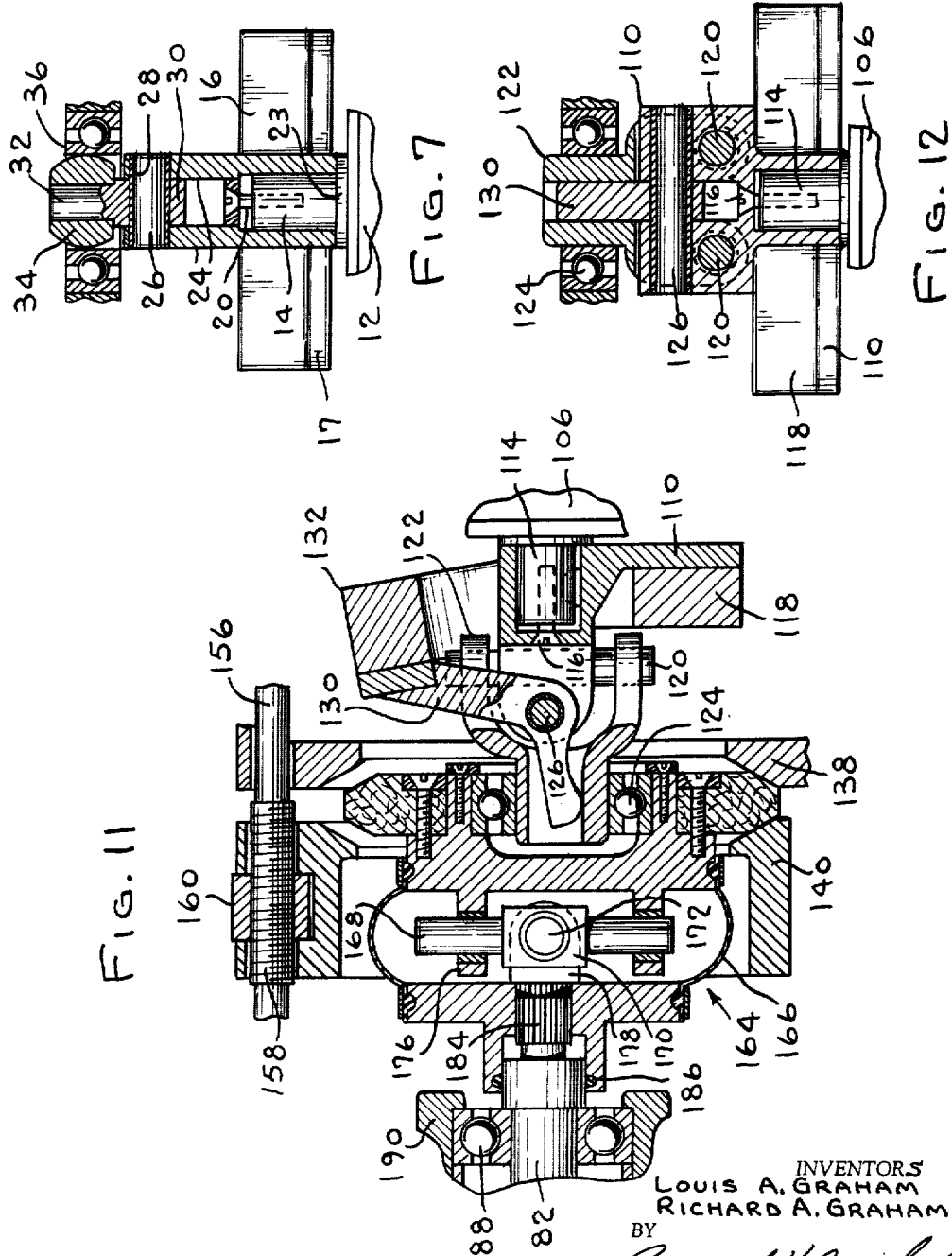

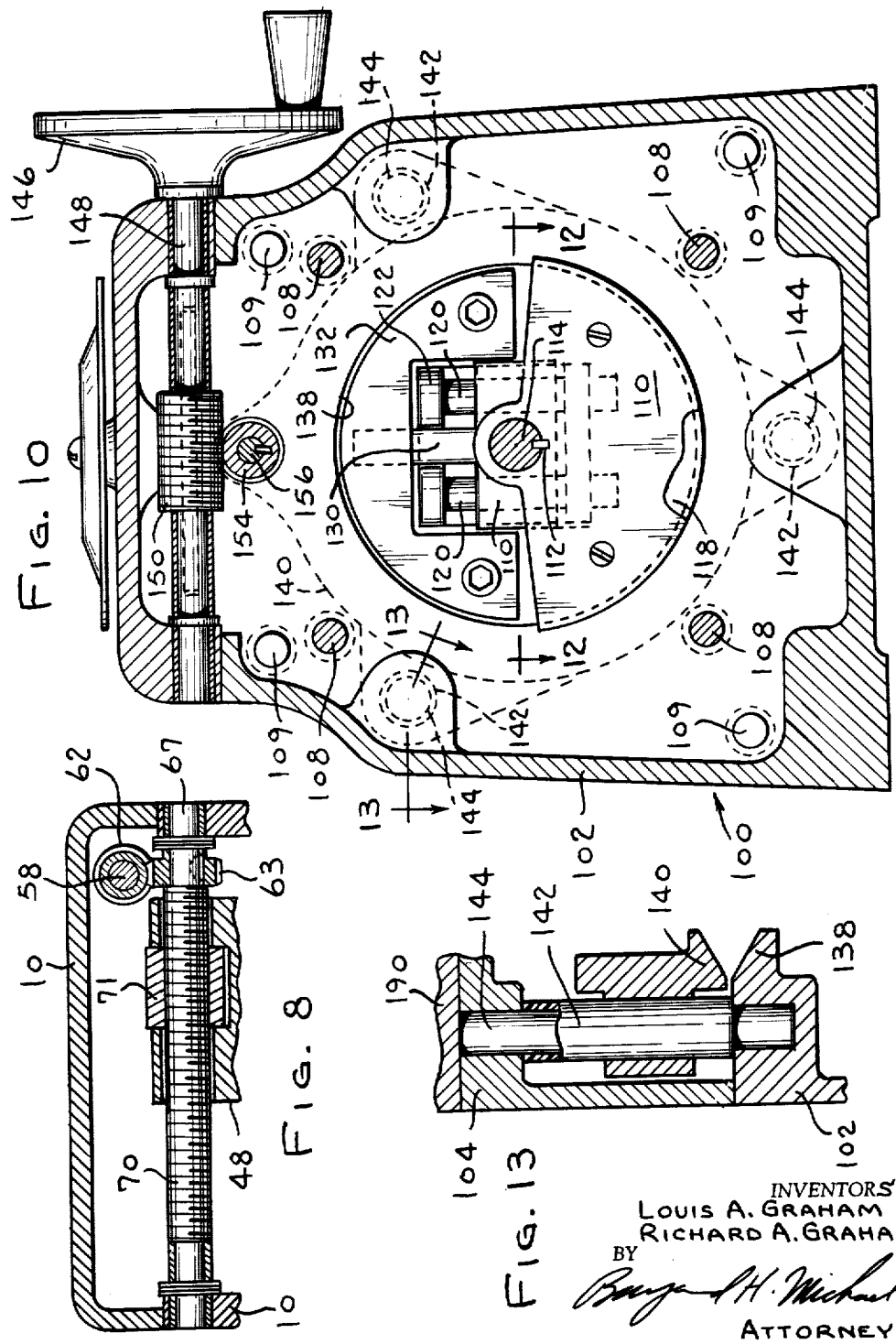

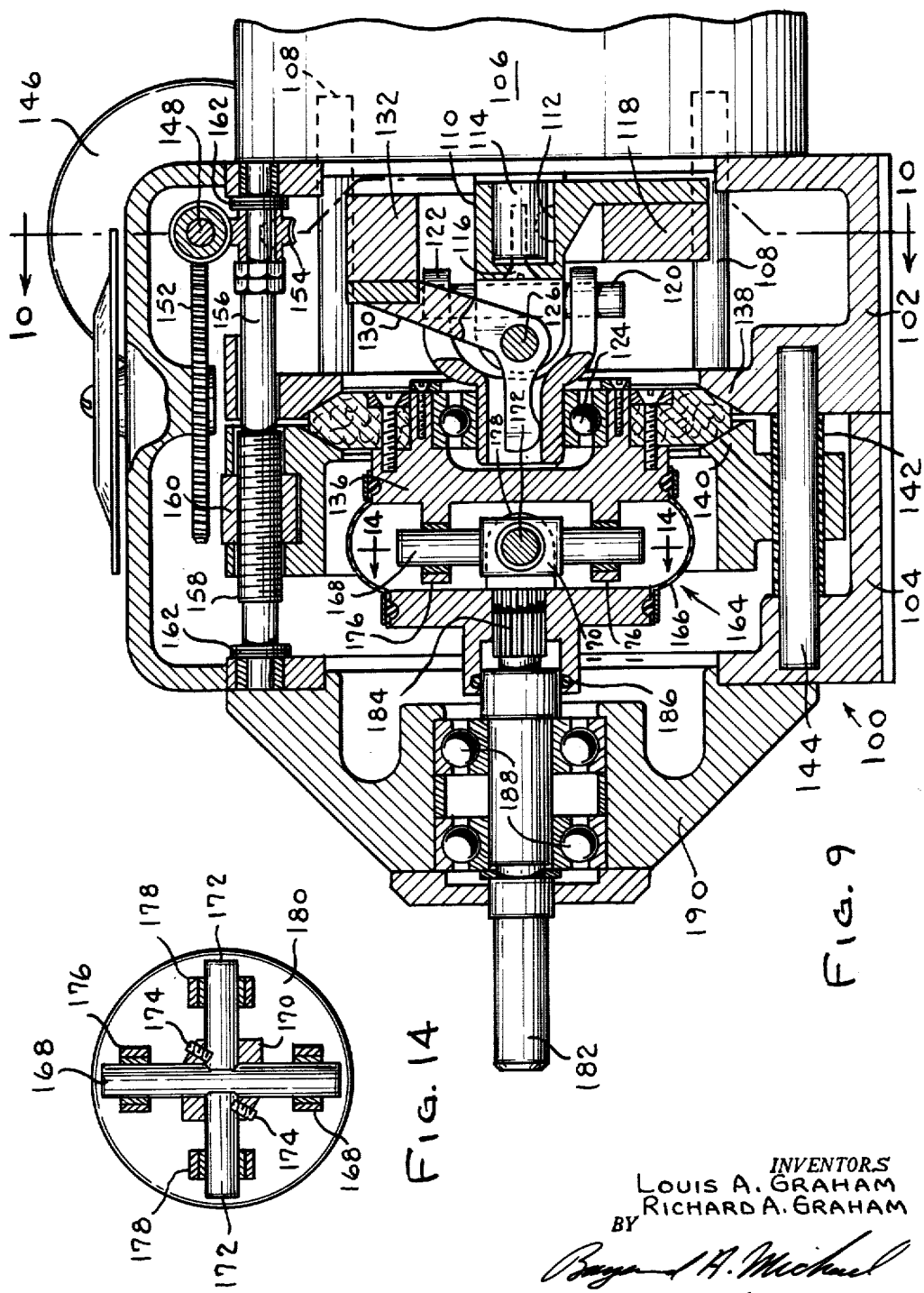

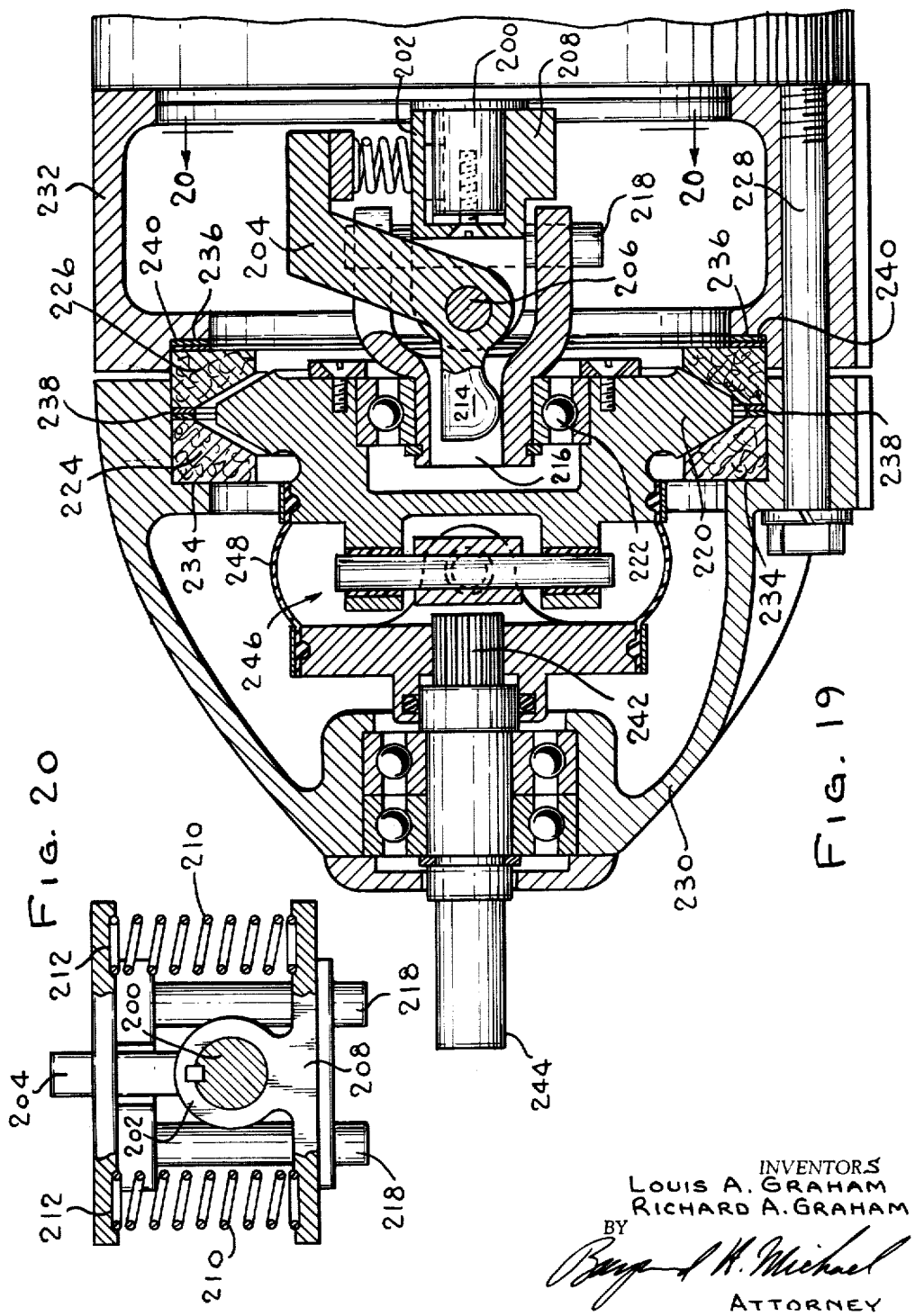

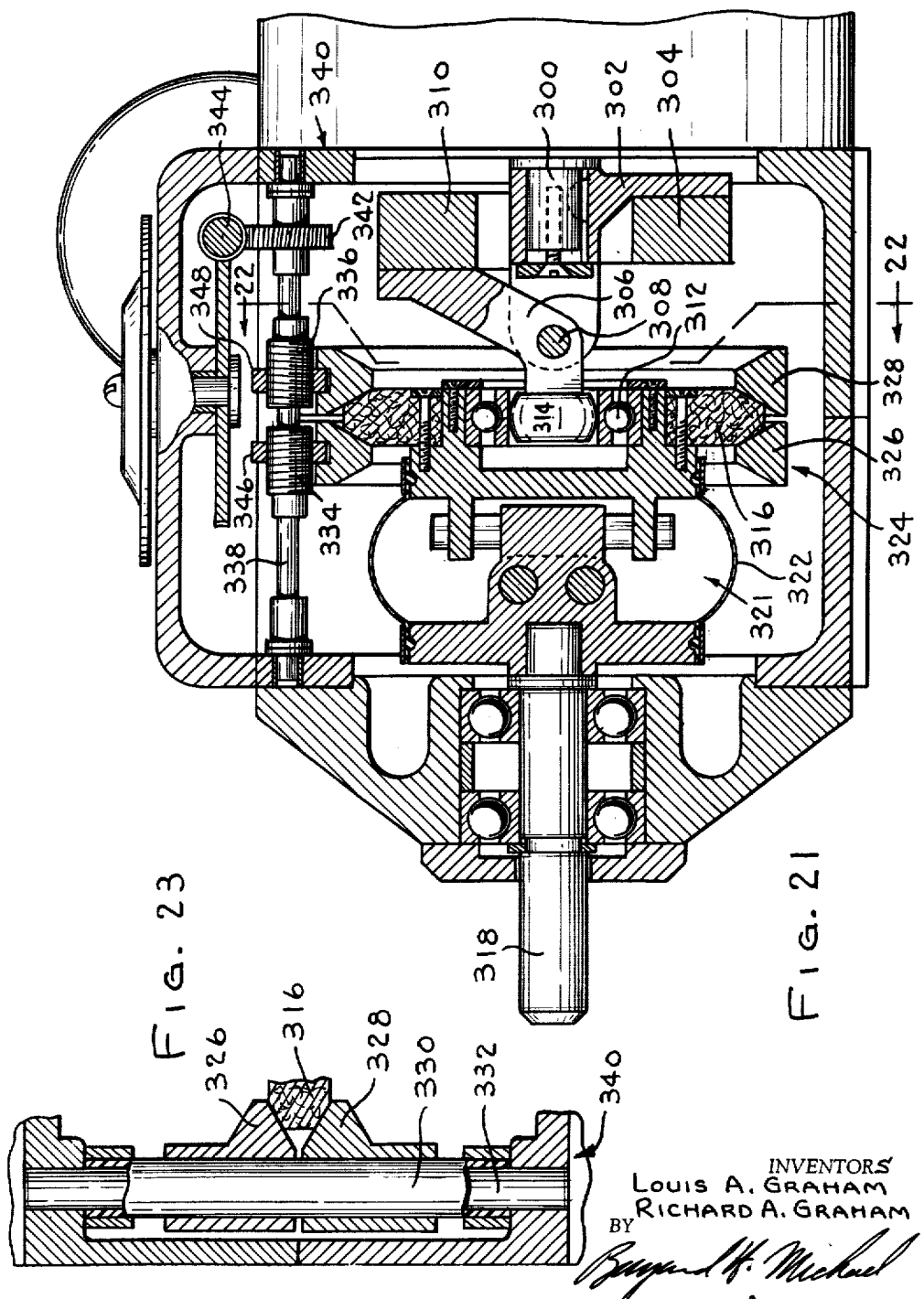

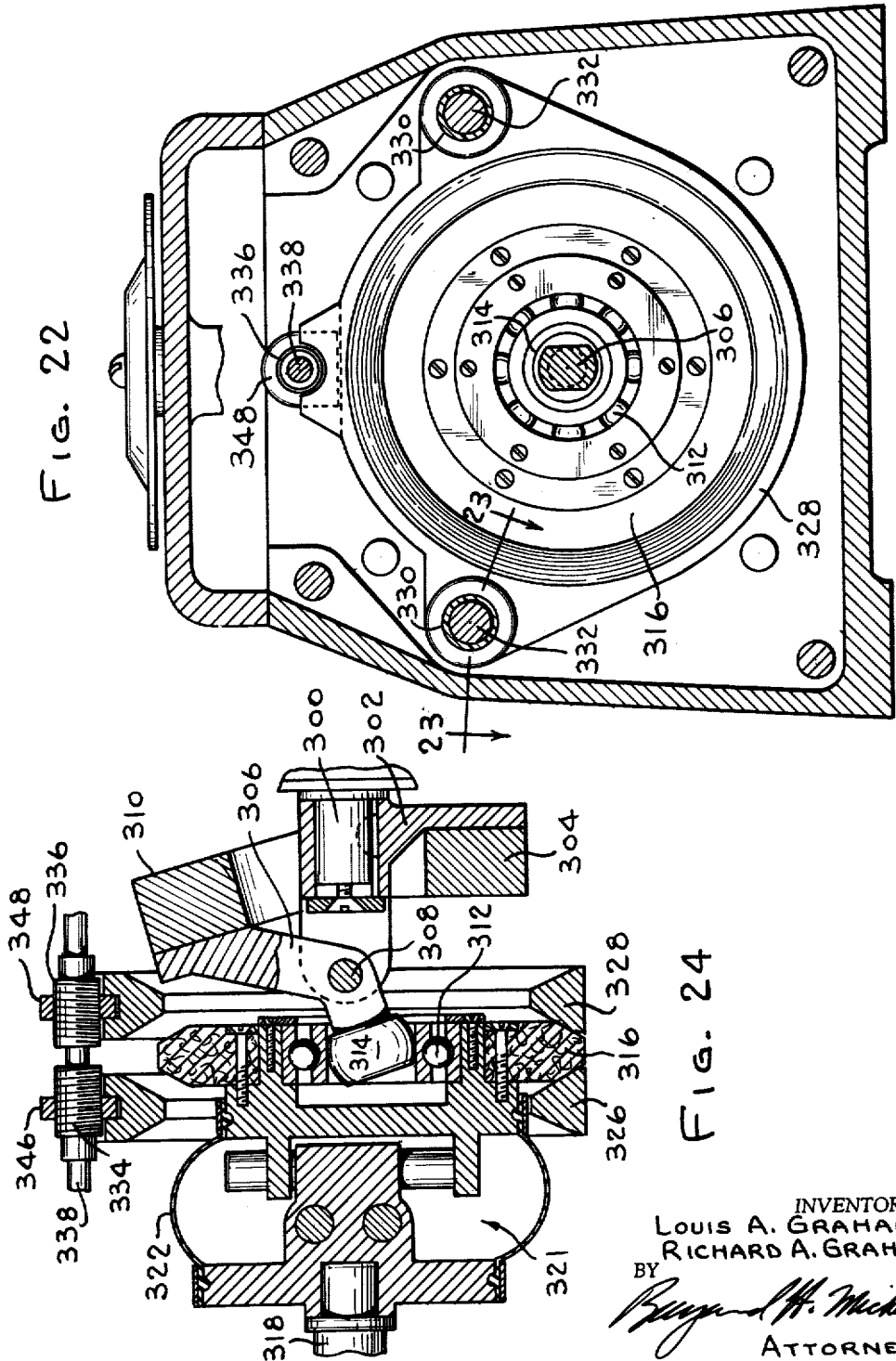

April 16, 1963   L. A. GRAHAM ETAL   3,085,450
TRANSMISSION
Filed Sept. 23, 1960   10 Sheets-Sheet 10
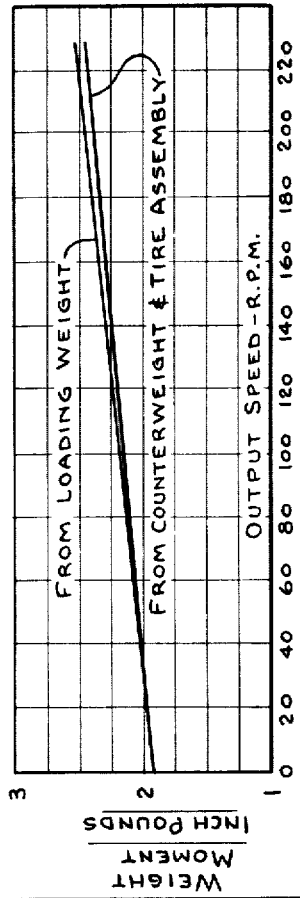
FIG. 27 (ACCURACY OF BALANCE)
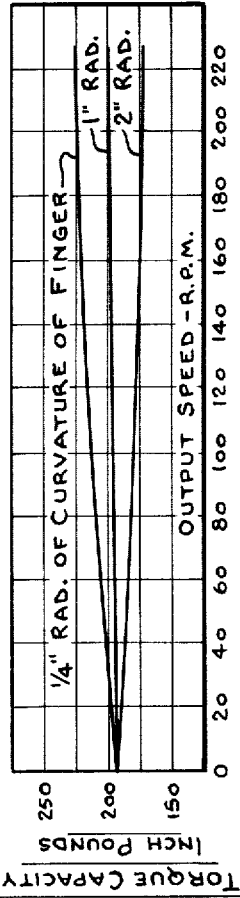
FIG. 28 (TORQUE vs. SPEED)
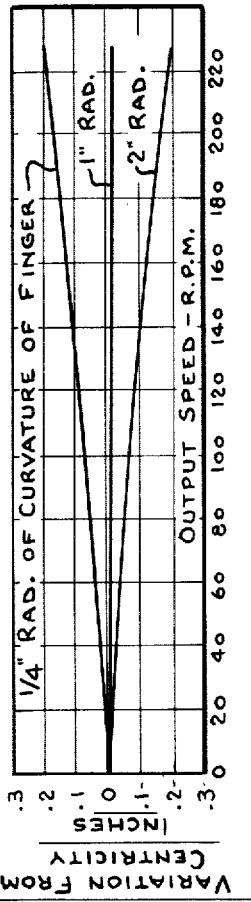
FIG. 29 (VARIATION FROM CENTRICITY)
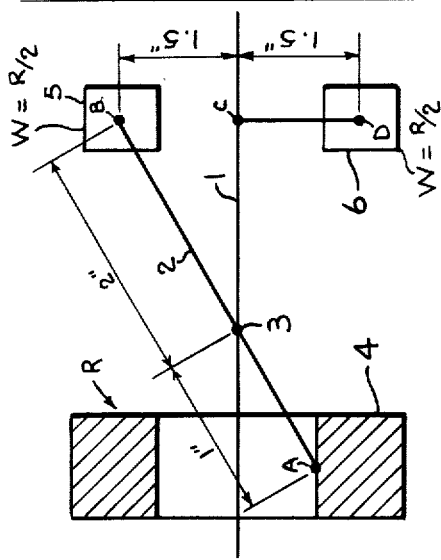
FIG. 25
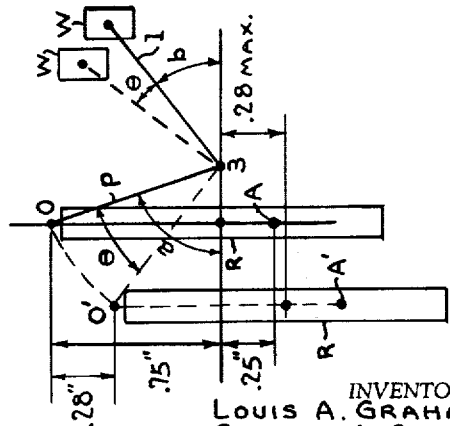
FIG. 26
INVENTORS
LOUIS A. GRAHAM
RICHARD A. GRAHAM
BY
ATTORNEY

United States Patent Office 3,085,450
Patented Apr. 16, 1963

3,085,450
TRANSMISSION
Louis A. Graham, Naples, Fla., and Richard A. Graham, Thiensville, Wis. (both % Graham Transmissions Inc., Menomonee Falls, Wis.)
Filed Sept. 23, 1960, Ser. No. 58,134
26 Claims. (Cl. 74—796)

This invention relates to improvements in dry traction transmissions of the type in which a single plant roller is made to contact an encircling stationary friction ring with the rotation of the roller being transmitted to the driven shaft in the form of uniform angular velocity through a coupling which absorbs the orbital motion of the planet. The ring may have a fixed bore in which event the transmission provides a fixed output speed. If the ring provides a variable bore, the output speed is variable. Thus, when the bore of the ring is made equal to the diameter of the planet, the output speed is zero and the output speed increases as the bore of the ring is increased to thereby increase the eccentricity of the planet, the output speed being equal to the input speed times the eccentricity of the roller divided by the radius of the roller.

Although this type of transmission offers important inherent advantages over other types because of its extreme compactness, its ability to deliver an infinite speed range of the output shaft from a maximum of about one-eighth the input speed down to zero; its concentricity of output and input shafts; its few parts; its avoidance of all toothed gearing; and its relatively small size because of the transmission of torque at the extreme dimension of the housing, it has never been successful previously because of a number of likewise inherent problems and difficulties not previously solved, including in particular: (1) inherent unbalance arising from the use of a single planetary roller or wheel whose eccentricity provides the speed reduction; (2) inherent "rotating-load" due to the constant cyclic change in direction of the contact pressure between the single wheel and ring; (3) inherent off-center application, in the conventional design, of the force producing traction; (4) inherent difficulty of mounting of the non-rotating ring so as to give ease of speed adjustment in variable speed applications while avoiding clatter and destructive vibration due to the "rotating-load" just mentioned.

The present invention aims to overcome these difficulties among others and thus make a transmission of the type described commercially feasible. As a result of the present invention, transmissions of this type can be provided at low cost and offer considerable advantages over alternate transmissions.

Another object of this invention is to provide for loading the planetary wheel while providing dynamic balance throughout the speed range of the transmission. The loading can be either centrifugal or centrifugal combined with spring loading and in either event, a movable loading weight is so mounted as to accurately balance the eccentricity of the wheel at all speeds.

Another object of this invention is to mount the single loading and balancing means at the end of a lever having a mechanical advantage which substantially cuts down the weight of such means required to provide the needed torque capacity.

Another object of this invention is to provide a desirable torque characteristic in a transmission of the type described. Previous transmissions of this general type have provided either insufficient torque at low speeds, or too much torgue (too much loading) at high speeds. The desired torque characteristic is had through suitable control of the mechanical advantage over the speed range as will hereinafter be explained.

Another object of the present invention is to provide means for loading the wheel centrally without developing adverse couples acting on the wheel.

Still another object of this invention is to provide a mounting for the friction ring which permits movement of the ring to obtain changes in output speed with a minimum of frictional resistance while retaining sufficient rigidity to absorb with a minimum of vibration the rotating load which is an inherent and troublesome characteristic of this type of transmission.

Another object of this invention is to provide a fixed speed transmission of the type described which can be readily modified to provide different reduction ratios while maintaining proper dynamic balance and loading characteristics within the range of ratios able to be selected.

Other objects and advantages will be pointed out in or be apparent from the specification and claims as will obvious modifications of the four embodiments shown in the drawings in which:

FIGURE 1 is a vertical section through one form of the transmission with the parts shown in the zero output speed position;

FIGURE is a cross-section taken as indicated by line 2—2 of FIGURE 1;

FIGURE 3 is a fragmentary view similar to FIGURE 1 with the ring moved to give a relatively high output speed;

FIGURE 4 is a section taken as indicated by line 4—4 on FIGURE 1;

FIGURE 5 is a fragmentary section taken as indicated by line 5—5 of FIGURE 3;

FIGURE 6 is a sectional view taken as indicated by line 6—6 on FIGURE 1 showing a form of the coupling which will take axial but not angular misalignment of the input and output portions of the coupling, and, hence, will locate one with respect to the other;

FIGURE 7 is a fragmentary sectional view taken along line 7—7 in FIGURE 2;

FIGURE 8 is a fragmentary section taken along line 8—8 of FIGURE 2;

FIGURE 9 is a vertical section through a transmission having a different ring arrangement which permits substantially doubling the power rating of the transmission without increasing the size;

FIGURE 10 is a section taken along line 10—10 in FIGURE 9;

FIGURE 11 is a fragmentary view of FIGURE 9 with the parts moved to increase the output speed;

FIGURE 12 is a fragmentary section taken along line 12—12 in FIGURE 10;

FIGURE 13 is a fragmentary section taken on line 13—13 in FIGURE 10 to illustrate the ring guides;

FIGURE 14 is a sectional view taken on line 14—14 in FIGURE 9 showing a coupling which will tolerate both angular and axial misalignment of the input and output parts of the coupling;

FIGURES 15, 16, 17 and 18 illustrate the form of coupling shown in FIGURE 14 in different rotational positions;

FIGURE 19 is a vertical section through a single speed modification;

FIGURE 20 is a section on line 20—20 in FIGURE 19 to show the loading arrangement;

FIGURE 21 is a vertical section through a further modification using a split ring both halves of which are movable;

FIGURE 22 is a section on line 22 in FIGURE 21;

FIGURE 23 is a fragmentary section on line 23—23 of FIGURE 22;

FIGURE 24 is a fragmentary section similar to FIGURE 21 showing the parts in their high speed position; and FIGURES 25, 26, 27, 28 and 29 are sketches and curves helpful in understanding how the mechanism employed here achieves the objects above set forth.

Before considering the drawings in detail, it should be pointed out that the form of transmission as shown in FIGURES 9 through 18 is preferred since the dual tractional surfaces gave it approximately twice the capacity within the same size as compared to the first modification. The other modifications shown here point up other constructional features having application under certain conditions as well as illustrating a single speed version which can be readily modified to select any of a number of reduction ratios and which permits great simplification of production inventory of single speed transmissions. It should be understood that the fundamental concepts hereinafter emphasized with respect to any particular modification can often be translated to other modifications.

In order to make clear in easiest fashion the principles underlying the method of combined loading and balancing here employed let us first consider a "simplified" theoretical case, not obtainable (or in one respect desirable) in practise but useful in illustrating the basic principles of this invention, as diagrammed in FIGURE 25. This shows shaft 1 and lever 2 having link 2″ long and shorter link 1″ long fulcrumed thereon at point 3. The lever is shown at the position of zero speed. The small end of the lever applies the loading pressure to the wheel 4, whose weight is R, at a point A within the wheel, at approximately its axial center. At the long end of the lever is mounted the loading weight 5, whose center of gravity is at the lever extremity B and which for the 2:1 linkage here shown would have a weight equal to $R/2$.

If the distance BC of center of gravity B from the transmission axis is say 1½″ then perfect balance is had at zero speed here shown if a fixed counterweight 6 of weight $R/2$ is rigidly attached to shaft 1 with its center of gravity D similarly 1½″ from the axis. Now it is evident that when the output speed is increased above the zero figure by permitting wheel 4 to become eccentric, point B will move outwardly from the axis a distance twice that moved outwardly by point A, point 3 remaining fixed. Accordingly, the increased moment of loading weight 5 about the axis will always be equal to the increased moment of weight 4 about the axis and perfect balance will be had at all speeds. However, this construction is not realizable in practice because it would require a "pencil point" contact at A which is not practical. Moreover, it is readily shown, below, that the torque characteristic over the speed range would not be desirable and that very nearly perfect balance over the full range may be had in the construction shown in FIGURES 1 to 24.

Obviously, at zero speed as here shown the torque capacity, which is derived entirely from centrifugal force, is proportional to the weight 5 ($R/2$ lbs.) times its radial distance BC (1½″) times the "leverage," which is the ratio 2:1 between the axial distances from points B and A to the fulcrum 3—or $3/2R$. As the speed is increased to a figure corresponding to the maximum eccentricity of say ¼″ (outward radial movement of point A), the torque capacity derived from the wheel is proportional to its weight times ¼″ or $R/4$ and the added torque capacity derived from the loading weight is $R/2 \times ½ \times$ leverage 2, or $R/2$, because in this "simplified" construction the "leverage" obviously remains constant over the speed range. The torque capacity is thus increased from a figure proportional to $3/2R$ at zero speed to a figure proportional to $3/2R$ plus $R/4$ plus $R/2$ or $9/4R$ at top speed. This means that the torque capacity at zero speed is ⅔ that at top speed. This relation, though far superior to that obtained in previous devices of this character, where in some cases virtually no torque at all was had at zero speed and the torque multiplied rapidly with increase in speed (a highly undesirable characteristic) is vastly improved in the actual construction diagrammed in FIGURE 26 and detailed in FIGURES 1 to 24 and where the impractical pencil point contact is released by a generously curved surface, with radius of curvature of 1″ or more in the "finger-loading" type shown in FIGURE 26.

It will now be shown by mathematical analysis how the four vital features of (1) balance, (2) leverage variation and consequent (3) maximum relative torque at zero speed and (4) centricity over the speed range are all obtained through the construction here described.

The essential departure in FIGURE 26 from FIGURE 25 is the manner of location of the point of pressure application between link and wheel. Since this is now through a curved surface, not a pencil point, with center of curvature, at zero speed, at the point O, the contact point at that speed will be at A, 1″ directly below point O (since the radius of curvature in the example is 1″). As the speed is increased, through increase of the wheel eccentricity from 0 to .28″, point O moves to O′, such that the vertical distance from 0 to O′ is .28″, and the pressure point moves from A to A′, directly below O′. We now check the accuracy of balance at any speed by comparing the increase in moment of the loading weight about the axis of the transmission, which is $W1$ ($\sin (\theta+b) - \sin b$) with the moment derived from the eccentricity of the wheel which is $Rp$ ($\sin a - \sin (a-\theta)$), where $\theta$ is the angular movement of the link. The two curves, FIGURE 27, show the numerical value of each of the total moments for a typical unit of ⅔ h.p. rating, as $\theta$ varies from 0 to maximum, and it is to be noted that the curves vary from coincidence by a very small amount. This is accomplished by proper choice of the four parameters $W$, 1, $p$ and $b$ (for a given size drive R is made as small as possible for lightest weight, as is the distance $p \cos a$), and it is clear that almost perfect balance is so had.

It will now be shown that exactly the desired relationship between torque capacity and speed is had by proper selection of the radius of curvature of the finger contact, which is here shown as 1″. As previously mentioned, most applications of variable speed transmissions call for greatest torque at the lowest speeds, so that if the design—as in all previous transmissions of this character, actually provided great increase of torque at top speeds due to the increased tractional loading at those speeds, the unit would have to be designed to carry these needlessly high loads and would be prohibitively large. This is here avoided by reduction of the "leverage" as the speed is increased. Numerically, the leverage at all speeds is, of course, equal to the ratio between the horizontal distances from the pivot 3, of weight W and center O or $$1 \cos (b+\theta)/p \cos (a-\theta)$$

Since point O moves away from the pivot as the speed is increased and W moves toward it, it is obvious that the leverage is decreased with increasing speeds, thus offsetting the effect of the outward movement of both weight and wheel, the decrease being greater for greater radii of curvature. The numerical influence of this reduction in leverage on the actual value of the torque capacity is readily had from the relation that at zero speed where the leverage is $1 \cos b/p \cos a$ the torque factor is this amount times $W1 \sin b$, and for any speed the torque factor is $$W1 \sin (\theta+b) \times 1 \cos (b+\theta)/p \cos (a-\theta) \text{ plus}$$
$$Rp (\sin a - \sin (a-\theta))$$

the second term being, of course, derived from the wheel eccentricity.

In FIGURE 28 curves are plotted, for comparison, between torque capacity and speed for radii of curvature of ¼″, 1″ and 2″, other dimensions remaining the same. Note that abscissas are given in terms of speed in r.p.m. rather than angle $\theta$, speed being proportional to eccentricity, which equals $p$ ($\sin a - \sin (a-\theta)$). Note the relatively greater torque capacity at low speeds, as compared with high, for the larger radii of curvature.

A final feature of great importance that is had from this invention and may be mathematically checked as below, is the maintenance of almost perfect centricity of load application over the speed range. This centricity avoids damaging offset forces, found in previous transmissions of this character. The speed is increased by moving one section of the control ring toward the output end (the other section remaining stationary), the wheel then moving an equal axial distance while moving eccentrically outward, impelled by the centrifugal force of the loading weight applied to the linkage, plus the centrifugal force of the wheel itself, as previously explained. The off-center distance is obviously the difference between the axial motion of the wheel which is $.58\ p\ (\sin a - \sin (a-\theta))$ and the axial motion of the contact point A, which is $$p\ (\cos (a-\theta) - \cos a)$$

the design being purposely such that the two motions are in the same direction.

The curve for 1″ radius of curvature, FIGURE 29, shows the negligible amount of this off-center distance for the dimensions given in the example. Incidentally, a point of advantage is that, though the centricity remains nearly perfect, a new surface of contact is had in the wheel as the speed is changed, since there is no axial motion of the sleeve itself against which the finger presses.

Considering now FIGURE 1 in detail, the main housing 10 of the transmission is secured to a motor housing 12 with the motor shaft 14 projecting into the transmission housing. A counterweight 16 is carried by adapter 17 which is keyed to the shaft 14 and is retained thereon by screw 20 threaded into the end of the motor shaft 14 and holding retainer 22 against the cooperating shoulder in the adapter to force the adapter against the shoulder 23 on the motor shaft. The adapter 17 includes ears 24 which support pin 26 in bushing 28 to pivotally mount the axially extending link or crank 30. The axially extending pin portion 32 of the crank supports a ball like member 34 which acts centrally of the inner race 36 of the ball bearing assembly which is retained in coupling adapter 38 by annular ring 40 and a plurality of screws 42. Referring to FIGURE 1, the portion of crank 30 which extends from the pivot upwardly and to the right carries loading weight 44. At the position shown in FIGURE 1, the transmission is at the zero output speed setting and the loading weight 44 is counter-balanced by counterweight 16 so as to result in dynamic balance.

Wheel 46 is secured to the coupling adapter 38 by a plurality of screws 47 and is adapted to contact the bore of the axially movable ring 48. The ring is guided by Nylatron (a high strength nylon having dimensional accuracy and impregnated with a solid lubricant such as molybdenum disulphide) sleeves 50 carried on rods 52. It has been found important to guide the ring on non-metallic material to obtain a desirable combination of rigidity, cushioning action and freedom from friction while permitting change of speed without binding. It will be appreciated that instead of having a ring slide on fixed rods, the rods could be fixed to the ring and in turn slide in suitable mounts in the housing. Similarly, bushings can be used in place of sleeves. Normally a ring or cylinder is guided in a housing by contacting a cylindrical bore or bored lands in the housing. In the present transmission, it has been found preferable to provide the two or more accurately spaced cushioned rods shown in the drawings with the rods so interconnected to the ring and housing as to fulfill the three necessary functions of the ring, that is, to take the torque while permitting axial movement and carrying the rotating load previously mentioned. Referring to FIGURE 2 it will be noted that the tie rods 54 used in mounting the housing 10 to the motor housing are disassociated from the ring.

The ring is actuated by turning hand wheel 56 to rotate shaft 58. Rotary motion of shaft 58 turns worm gears 60 and 62. Worm gear 60 engages gear 64 which is fixed on shaft 66 to turn a suitable indicating dial 68 while worm gear 62 engages worm 63 to turn shaft 67, to which it is keyed, and thereby impart rotary motion to lead screw 70 which is threaded into nut 71 which engages ring 48 axially but not radially to avoid imparting radial loads to the lead screw from the ring. Thus, turning the hand wheel will effect axial motion of the ring 48.

The position illustrated in FIGURE 1 will give zero output speed since there is no eccentricity of the tire. At zero speed the loading weight is counterbalanced by the counterweight. The centrifugal force of the loading weight applies a loading force to the wheel centrally of the wheel. Thus, at zero speed the wheel is loaded. When the hand wheel is actuated to move the ring 48 to the left the effective bore of the ring will be increased and the output speed will increase. Since the wheel is loaded at zero speed, adequate torque can be obtained at very low output speeds. As the effective bore of the ring is increased, the eccentricity of the wheel will be increased and the loading weight will move out to balance the eccentricity of the wheel.

At zero speed the wheel is centrifugally loaded by the loading weight which, in turn, is counterbalanced by the counterweight. As the output speed is increased the eccentricity of the wheel is balanced by the movement of the loading weight further from the axis of the shaft. Thus, dynamic balance is retained throughout the speed range while affording centrifugal loading at zero and near zero speeds to give high torque near zero. The advantage of centrifugal loading is, of course, that the speed setting can be changed with the transmission at rest.

As the wheel rolls around the interior of the bore, a planetary motion will be imparted to the wheel and the associated coupling adapter 38 consisting of the rotary motion of the wheel about its own center the orbital motion of its center about the center line of the transmission. The rotary motion will be equal to the speed of the input shaft multiplied by the eccentricity of the wheel divided by the radius of the wheel. For example, if the eccentricity is ⅛ of the wheel radius, the output speed will be ⅛ of the input speed.

The wheel motion is transmitted and translated by coupling 72 to output shaft 74 to impart uniform angular velocity to the shaft. Thus, coupling adapter 38 is provided with spaced ears 76, each of which is provided with suitably bushed holes in which parallel rods 78, 78 may reciprocate. The rods are fixed in block 80 by set screws 82. Another pair of rods 84, 84 are fixed by screws 86 in block 80 to reciprocate in the bushed holes in ears 88 carried by the coupling output 90. It will be noted that rods 78, 78 are at right angles to rods 84, 84 and, therefore, the orbital and planetary motion can be transmitted by the coupling with the orbital motion being adsorbed in the rods. Axial misalignment between the output shaft and the center of the wheel 46 can be readily accommodated. It will be noted that the coupling can transmit thrust which is, of course, necessary to hold the wheel in contact with the ring.

The coupling output 90 is fixed on output shaft 74 which is journalled in bearings 92, 92 in the housing and bell 94. It will be noted that since the coupling output 90 is fixed on the output shaft and since the pins necessarily locate the coupling adapter 38 parallel to the coupling output 90, the wheel 46 must, therefore, be parallel to the coupling output 90. Therefore, the wheel is located in a plane normal to the output shaft axis by the coupling and thus the wheel is forced to track in the proper plane normal to the output shaft axis. It is necessary to locate the wheel in such a plane since (see FIGURE 3) when the wheel is rotating on an eccentric orbit, there would be nothing to prevent the wheel from wobbling without some means for holding the wheel in a normal plane.

Referring again to FIGURE 3, it will be noted that as the wheel moves out to an eccentric path, the loading weight 44 rocks the axially extending link or crank 30 and the point of contact between ball member 34 and the inner race of the ball bearing will move slightly to the right. The point of contact is designed to stay close as possible to the center line of the wheel to avoid development of a couple in the wheel. This feature has been found to be of great importance in the fabrication of a satisfactory transmission. It will be noted that the ball merely presses against the race and, hence, any axial adjustment necessary in assembly by reason of additive tolerances can be accommodated at this point. This feature facilitates assembly of the transmission.

Recapitulating the important points with respect to the first modification, it is first to be noted that the counterweight 16 and the loading weight 44 are designed and located to balance out at zero output speed with the loading weight being such as to give nearly full torque at near zero speed which is an essential requirement of a good transmission. This balancing avoids setting up vibrations which would seriously limit life of the transmission. As the ring is moved to increase the eccentricity of the wheel, the loading weight will move out to balance the eccentricity of the wheel assembly so as to retain dynamic balance throughout the output speed range. By carrying the loading weight on the pivoted link, it is possible to gain mechanical advantage permitting use of a relatively small weight which, in turn, makes possible a compact design. The pivoted link also has advantage in that the axially extending portion can be utilized to deliver the loading forces to the wheel centrally of the wheel to avoid overhung forces. The pivotal action of the link is, of course, most advantageous in maintaining both dynamic balance and a desirable loading characteristic while making it possible to obtain high torque at low speed. It will be noted from the numerical values given in FIGURES 25 and 26 that the added radial distance from the axis of the center of gravity of the loading weight as the output speed is increased to maximum is only about one-third its initial radial distance from the axis at zero speed. This relation is essential for obtaining an approximately constant torque characteristic over the speed range, as heretofore explained.

Another point of importance is that the wheel assembly must be located and held in a plane normal to the output (or input shaft axis) to avoid wobble in the wheel and consequent vibration. This is accomplished in this modification by means of a coupling 72. The coupling, incidentally, is totally enclosed within boot 96 clamped to coupling adapter 38 and to coupling output 90 so as to permit lubricant to be retained around the coupling while preventing the lubricant from getting on the dry traction surfaces of the wheel and ring. Similarly, the ball bearings between axially extending link 30 and the wheel assembly should be of a sealed type to permit adequate lubrication of the ball bearing without allowing lubricant to get on the dry traction surfaces. The output shaft bearings 92—92 and the input shaft bearings (not shown) should also be of the sealed type or separate seals should be provided.

A further feature found important in the transmission shown here is the provision of the non-metallic sleeve on the ring guides with the wear consequent to movement of the ring being distributed along the sleeves rather than being concentrated on a localized area in a bushing.

In the modification just described, the face angle of the ring is approximately 10 degrees while in the modification shown in FIGURES 9 through 18, the ring takes the form of a split ring having approximately 60 degree faces which permits substantially doubling the output of the transmission (because of the triangle of forces—that is, a force is opposed by two equal forces acting at 60 degrees) without increasing the size of the transmission. It is for this reason that this modification is preferred over the first. The doubled tractional capacity obtained in the second modification does not result in any increase in the load on the input parts. Furthermore, there is no horizontal force (thrust) component on the ring which would have to be taken in the output shaft bearings as in the first modification.

Considering the second modification now in detail, housing 100 is in the form of a split housing 102, 104 with housing half 102 being secured to motor housing 106 by screws 108 and the left hand housing half 104 being secured to the right half of the housing by separate screws 109. The arrangement permits simple access to the traction wheel assembly for replacement of the wheel if this should become necessary.

Drive adapter 110 is keyed at 112 to motor shaft 114 and is held onto the shaft by screw 116. The drive adapter in this modification carries counterweight 118 as in the first form of this invention. A pair of drive pins 120 are fixed in the drive adapter 110. The forked end of spider 122 may slide on the pins 120 while the hub portion of the spider projects to the left inside the inner race of bearing 124. This must be a sliding fit between the spider hub and the inner race of the bearing to allow axial wheel motion as will appear hereinafter. The drive adapter also carries a pin 126 which permits the axially extending link 130 to act on the interior of the spider hub while the other end carries the loading weight 132. Here again the counterweight 118 and the loading weight 132 balance each other at the zero speed setting (illustrated in FIGURE 9) while the loading weight acts to give nearly maximum torque at near zero speeds. As the output speed is increased the loading weight balances the eccentricity of the wheel to maintain dynamic balance while maintaining a desirable torque characteristic. The wheel is secured to the coupling adapter 136 in the same manner as in the first embodiment. The wheel runs in a split-ring assembly with the right half 138 of the split-ring being a part of the right half of the transmission housing. The left half 140 of the split-ring is axially movable to vary the spacing between the ring halves and hence permit variation in the effective bore of the ring assembly. The movable ring is carried on the Nylatron sleeves 142 (FIGURE 13) on three rods 144. The purposes underlying such a mounting have been previously described but the use of three rods is different in this case. If but two rods are used to support the ring bushings 144 are subjected to excessive wear while use of three rods overcomes this objection.

The axial motion of the ring is controlled by turning hand wheel 146 to turn shaft 148 and the associated worm gear 150. This worm gear engages both the indicator dial gear 152 and the worm 154 keyed on shaft 156. Shaft 156 is provided with a lead screw portion 158 with threads through nut 160 carried by the movable ring half 140. Axial thrust on the shaft 156 is absorbed in thrust bearings 162, 162. As the movable ring half 140 is moved from the position shown in FIGURE 9, where there is zero output speed, to a position such as that shown in FIGURE 11, where the output speed has been increased to a value determined by the formula mentioned above. The tire will take planetary motion which is then transmitted and translated by the coupling 164 enclosed in boot 166. This coupling comprises a pin 168 fixed in block 170 by sub pins 172, 172 which are, in turn, retained in place by set screws 174, 174. Pin 168 slides in bushings in ears 176, 176 projecting from the coupling adapter 136. The set of fixed pins 172, 172 in turn slide in bushings in ears 178, 178 projecting from the coupling output plate 180. This output plate is splined on output shaft 182 at 184. An O-ring seal 186 is provided between the coupling output 180 and the output shaft 182 to prevent flow of lubricant from the coupling (within the boot) past the output shaft and into the transmission housing where it could get on the dry traction faces. The output shaft is journalled in bearings 188, 188 carried in the housing end bell 190 as shown.

Reference to FIGURE 11 indicates that the tire rolling between the inclined faces of the split-ring would tend to be self-stabilizing and prevent wobble of the wheel. In practice this does not prove to be the case and some wobble appears to be inherent with a coupling such as coupling 164 which, as can be readily determined upon inspection of the drawings, can tolerate both angular and axial misalignment while absorbing within the coupling any orbital motion to thereby transmit uniform angular velocity to the output shaft. The operation of the coupling can be noted readily in FIGURES 15–18. The tendency for the wheel to wobble within the split-ring is overcome by locating the wheel assembly in a plane perpendicular to the axis of the input and output shafts by means of the spider hub which has a sliding fit inside bearing 124 with the outward motion being taken in the pins. Since this hub locates the wheel normal to the input shaft (and hence normal to the output shaft) the tendency for the wheel to wobble or vibrate is virtually eliminated.

As the ring halves are moved apart to increase the eccentricity it will be noted that the wheel must also move (to the left) to retain its position between the ring faces. Therefore, there must be provision for axial motion between the bearing and the spider hub. Similarly, there must be provision for axial motion between the coupling output 180 and the output shaft 182. This is accommodated in the splined connection between the two. In this modification it will be noted that the loading of the wheel assembly is again substantially central of the wheel assembly.

The modification shown in FIGURES 19 and 20 is a fixed speed version of the transmission which permits rapid field selection of the output speed. Here the input shaft 200 is keyed to adapter 202 which supports link 204 on pivot 206. The adapter includes a counterweight portion 208 which extends generally tangentially as illustrated in FIGURE 20 to form seats for compressed springs 210 which act against the spring seat portion 212 of link 204. The axially extending portion 214 of the link acts centrally of the wheel assembly in the spider 216 which is slidably mounted on pins 218 carried by the adapter. The spider, therefore, fixes the wheel 220 in a plane normal to the input shaft axis and transmits force to the wheel from the axially extending link 204 to the bearing 222. The wheel rolls in the split ring having two halves 224, 226 which are retained in place by bolts 228 clamping the belled housing portion 230 to the generally cylindrical housing portion 232 with shoulders 234, 236 clamping the ring halves. It will be noted that there are some shims 238 between the ring halves and there are some shims 240 located between ring half 226 and housing 232.

The provision of the shims 238, 240 makes possible a rather simple conversion to other output speeds. Thus, if it is desired to decrease the output speed one of the shims 238 can be moved from the illustrated position to the right of ring half 226 and thus decrease the effective bore of the ring and thereby decrease the output speed. Similarly, the speed can be increased by taking a shim 240 and placing it between the ring halves. The same number of shims remain in the assembly and, hence, the axial dimensions are not affected. It is, of course, necessary to make some provision for axial motion of the wheel and this is done at the output spline 242 and journal as in the variable speed version just described. The motion of the wheel is transmitted to the output shaft 244 through the two rod coupling 246, the details of which have been described heretofore. Here again, the coupling is enclosed by the flexible boot 248 to retain the lubricant.

This modification incorporates spring loading as well as centrifugal loading. Since the weight of the loading weight is reduced it is necessary to reduce the weight of the wheel assembly for the reason that these weights are interdependent as pointed out previously. The spring loading is not a problem as it is in the variable speed versions where it would be difficult to change speed settings against the spring force when the transmission is at rest. This is, of course, no problem in the present version since the speed change can only be effected by changing the shim arrangement. Providing the present shim arrangement for changing speed, it is possible to provide a single speed transmission offering many possibilities of output speeds with very little by way of inventory problems.

The construction of FIGURE 19 could be modified to employ a single piece, flat ring member which would reduce side-spin at the tractional contact at the expense of reducing torque capacity. Change of speed ratio in such a construction would require a change in bore of the ring.

The final modification is illustrated in FIGURES 21 through 24 where the input shaft 300 is keyed to adapter 302 carrying the fixed counterweight 304 and supporting axially extending link 306 on pivot pin 308. The link carries the loading weight 310 which acts centrally of the bearing 312 through the ball portion 314 of the link to load the wheel 316 as described before. The wheel assembly is connected to the output shaft 318 by means of a four rod coupling 321 enclosed in flexible boot 322 and having its output fixed on shaft 318. This coupling has been described before and serves to fix the wheel in a plane normal to the shaft axis while permitting radial motion as the effective bore of the ring assembly 324 is changed.

The ring assembly includes two ring halves 326, 328, both of which are supported and guided on the non-metallic sleeves 330 carried by pins 332. The ring halves are actuated by the oppositely threaded lead screw portions 334, 336 on shaft 338 rotatably supported in the housing 340. Gear 342 mounted on shaft 338 is actuated by worm gear 344, as in the second modification, to rotate the shaft 338. Rotation of the shaft will cause the lead screw portions 334, 336 to drive the nuts 346, 348 to or from each other simultaneously. The nuts are floatingly connected to the ring halves 326, 328 to transmit axial motion to the ring halves without absorbing radial loads.

In this version, therefore, it will be seen that the ring halves move to or from each other by equal increments so that the wheel 316 remains in the same axial location and merely moves in or out radially as the effective bore of the ring assembly 324 is changed. This type of construction obtains the doubled capacity of the version shown in FIGURE 9 but eliminates the necessity for the output spline and also eliminates the necessity for the input spider. The latter feature permits the use of a shorter crank and thus reduces the amount of loading weight required which, in turn, reduces the load on the input bearings. The elimination of the output spline is, of course, a material cost reduction. Another feature of the present loading assembly is that it is easier to balance than is the spider type of input.

The ring actuation illustrated in FIGURE 21 calls for accurate line up of the control assembly with respect to the wheel due to the provision of the ring and left hand threads on the control shaft. An alternative arrangement would be to fix one ring half axially with respect to the control shaft and to thread the connection between the control shaft and the other half of the ring while permitting the control shaft to have axial motion with respect to the housing. This would permit the two ring halves to seek a central position with respect to the wheel assembly.

If desired, a two rod coupling could be employed with the present ring actuation in which event the output of the coupling would be splined to the output shaft and a spider type input would be required.

The advantages of this modification are numerous.

No input guides are needed so it is necessary to provide for axial movement of the wheel. Since the wheel does not move the loading can be maintained central (to avoid couples). The ball loading uses a shorter arm (better mechanical advantage). The ring can float and no spline is required. The balance is easier to obtain (as compared to a spider which is more difficult to balance). The ball loading avoids localization of the contact point and obtains the favorable change in moment arm (as in FIGURE 26 sketch).

In the discusstion of the various variable speed modifications, the counterweight has been illustrated as being fixed. In some instances it may be desirable to provide the axially extending link with an arm depending from the pivot point to support the counterweight so that the counterweight will move as the wheel eccentricity is changed. In such an arrangement the counterweight would be almost directly below the pivot point when the eccentricity of the wheel is zeo. As the eccentricity of the wheel is increased, the counterweight would move counterclockwise about the pivot point with its motion through the range of the transmission being almost entirely in a horizontal direction. Therefore, as the counterweight moves to the right of the pivot point, it exerts a movement about the pivot point decreasing the load on the wheel and giving a decreasing torque characteristic while not affecting the accuracy of balance. There may be some uses where such a characteristic is desirable and it should be understood that the present invention is not limited to a fixed counterweight arrangement.

Recapitulating certain features of the various modifications it is to be noted that the balancing arrangement shown here results in substantial balance while achieving centrifugal loading and high torque at low speed. The axially extending link permits loading the wheel centrally to avoid developing a couple in the wheel. The use of a leverage keeps the loading weight size and weight within reasonable bounds while allowing the initial distance of the weight to be kept large as compared to its subsequent movement (thereby insuring high torque at low speed). The ball type loading gives the favorable effect on the moment arm of the wheel. As pointed out above, the various weights and lever arms are interdependent and from this it is seen the weight of the parts are changed to change the capacity of the transmission.

Although but four embodiments of the present invention have been illustrated and described, it will be apparent to those skilled in the art that various changes and modifications may be made therein without departing from the spirit of the invention or from the scope of the appended claims.

We claim:

1. A transmission comprising, a shaft, traction wheel means connected to the shaft with its center eccentric to the shaft, ring means encircling the wheel, the wheel means rolling inside the ring means, means restraining rotary motion about the shaft axis of one of the aforesaid means whereby the other of the aforesaid means will have rotary motion about the shaft axis and lever means carried by the shaft for pivotal movement about an axis transverse to the shaft axis and having a wheel loading portion operatively engaged with the wheel on one side of said pivot and a centrifugal weight carried by the lever on the opposite side of said pivot for loading the wheel and for balancing the eccentricity of the wheel at all speeds.

2. A transmission comprising, a shaft, traction wheel means connected to the shaft with its center eccentric to the shaft, ring means encircling the wheel, the wheel means rolling inside the ring means, means restraining rotary motion about the shaft axis of one of the aforesaid means whereby the other of the aforesaid means will have rotary motion about the shaft axis and means including an axially extending pivotal link acting centrally of the wheel means for loading and balancing the wheel.

3. A transmission according to claim 2 including means for varying the effective diameter of said ring means whereby the speed of rotation of said wheel means is varied.

4. A transmission comprising, a shaft, a traction wheel connected to the shaft, ring means encircling the wheel so the wheel rolls inside the ring, means restraining the ring means against rotation about the shaft, and centrifugally responsive movable weight means mounted on the shaft for movement about a transverse axis for loading the wheel and for balancing the eccentricity of the wheel.

5. A transmission according to claim 4 in which the effective bore of the ring means can be varied, and means for balancing the centrifugally responsive movable weight means when the effective bore of the ring is reduced to the diameter of the wheel, said centrifugally responsive movable weight means being effective to load the wheel when the effective bore of the ring is reduced to the diameter of the wheel.

6. A transmission according to claim 4 in which the effective bore of the ring means is variable, said loading and balancing means including an axially extending pivotal link acting centrally of the wheel and having a weight positioned to balance the eccentricity of the wheel.

7. A transmission comprising a housing, input and output shafts in the housing, non-rotatable ring means in the housing, a traction wheel connected to the input shaft for rolling motion inside the ring means with its center eccentric to the input shaft axis, means for moving the ring means axially to vary the effective bore of the ring means, coupling means connecting the wheel to the output shaft, and centrifugally responsive movable weight means mounted on the shaft for movement about a transverse axis for loading and balancing the wheel at all speeds.

8. A transmission according to claim 1 in which the centrifugally responsive movable weight means includes a loading weight pivotally connected to the input shaft and acting centrally of the wheel, said transmission including a counterweight carried by the input shaft to counterbalance the loading weight when the eccentricity of the wheel is zero.

9. A transmission comprising, a housing, input and output shafts in the housing, non-rotatable ring means in the housing, a traction wheel connected to the input shaft for rolling motion inside the ring means with its center eccentric to the axis of the input shaft, coupling means connecting the wheel to the output shaft, a bearing located centrally of the wheel, a crank-like link pivotally mounted on the input shaft with one of its arms projecting axially of the shaft into the bearing and operatively connected thereto, the other link arm projecting generally radially of the shaft and acting to load and dynamically balance the eccentricity of the wheel at all speeds.

10. A transmission according to claim 9 including spider means interconnecting the input shaft and the wheel with the one link arm acting on the wheel through a portion of the spider means and the bearing.

11. A transmission according to claim 7 in which the ring means comprises two movable parts presenting inwardly diverging faces on which the wheel rolls, means for moving the ring parts towards and from each other, means mounting the wheel to restrain the wheel from axial movement as the bore of the ring is changed.

12. A transmission comprising a shaft, a wheel connected to the shaft, a split ring presenting an inwardly diverging surface on which the wheel rolls, means fixing the wheel in a plane normal to the shaft axis, centrifugally responsive movable weight means mounted on the shaft for movement about a transverse axis for centrifugally loading and dynamically balancing the wheel, and means for balancing the loading effect of the centrifugally responsive movable weight means under the conditions obtaining when the axis of the wheel is concentric to the axis of the shaft.

13. A transmission according to claim 12 in which the fixing means comprises another shaft and coupling means connecting the wheel to said another shaft.

14. A transmission according to claim 12 including a housing, the split ring being mounted in the housing, and shims between the ring halves to establish the effective bore thereof.

15. A transmission comprising, a shaft, traction wheel means connected to the shaft with its center eccentric to the shaft, ring means encircling the wheel, the wheel means rolling inside the ring means, means restraining rotary motion about the shaft axis of one of the aforesaid means whereby the other of the means will have rotary motion about the shaft axis, an eccentric weight carried by a lever mounted on the shaft for pivotal movement about a transverse axis and having a wheel loading portion operatively engaged with the wheel for loading the wheel means at all speeds, and a counterweight balancing the loading weight when the axis of the wheel means is concentric to the axis of the shaft.

16. A transmission according to claim 15 in which the loading weight is carried on an axially extending pivoted link.

17. A transmission according to claim 15 in which the force of the loading weight acts substantially at the axial center of the wheel means.

18. A transmission according to claim 15 in which the loading weight is carried on an axially extending pivoted link, the length of the link arms being substantially inversely proportional to the weights of the wheel means and the loading weight.

19. A transmission according to claim 15 in which the center of gravity of the loading weight is radially spaced from the axis at zero speed at least twice the radial motion of the weight as the speed is increased to maximum.

20. A transmission comprising, a shaft, traction wheel means connected to the shaft with its center eccentric to the shaft, ring means encircling the wheel, the wheel means rolling inside the ring means, means restraining rotary motion about the shaft axis of one of the aforesaid means whereby the other of the means will have rotary motion about the shaft axis, means including a lever pivoted on the shaft for movement about a transverse axis and carrying a centrifugally responsive weight for simultaneously loading the wheel means and balancing the eccentricity of the wheel means, and means for balancing the minimum eccentricity of the pivoted weight without affecting the wheel means loading effected by the pivoted weight.

21. A transmission according to claim 20 including means for varying the eccentricity of the wheel means, the radial movement of the centers of gravity of the weight and of the wheel means being inversely proportional to their weight.

22. A transmission comprising, a shaft, traction wheel means connected to the shaft with its center eccentric to the shaft, ring means encircling the wheel, the wheel means rolling inside the ring means, means restraining rotary motion about the shaft axis of one of the aforesaid means whereby the other of the means will have rotary motion about the shaft axis, means for varying the effective diameter of the ring means for selectively positioning the wheel axis either concentric to or eccentric to the axis of the ring whereby the rotary motion of the wheel means is varied, a movable loading weight mounted on a lever carried by the shaft for pivotal movement about a transverse axis and including a portion acting on the wheel means to load the wheel in all relative positions of the wheel and ring axes and a fixed counterweight positioned to balance the loading weight when the axis of the wheel and the axis of the shaft are concentric.

23. A transmission comprising, a shaft, traction wheel means connected to the shaft with its center eccentric to the shaft, ring means encircling the wheel, the wheel means rolling inside the ring means, means restraining rotary motion about the shaft axis of one of the aforesaid means whereby the other of the means will have rotary motion about the shaft axis, and means for varying the effective diameter of the ring means whereby the eccentricity and rotary motion of the wheel means are varied, movable wheel loading weight means including a centrifugally movable weight mounted on the shaft for movement about a transverse axis and having a portion acting on the wheel means, the eccentricity of the loading weight changing as the eccentricity of the wheel means changes, and a fixed counterweight balancing the loading weight when the axis of the wheel is concentric to the axis of the shaft.

24. A transmission according to claim 15 in which the loading weight is carried on an axially extending link having a curved portion acting generally at the axial center of the wheel means, the radius of curvature of the curved portion being selected to give a substantially constant torque over the speed range.

25. A transmission comprising, a shaft, a traction wheel connected to the shaft, a ring encircling the wheel so the wheel rolls inside the ring, means for varying the effective bore of the ring to thereby vary the eccentricity and rotary motion of the wheel inside the ring, means including a loading weight carried by a lever pivotally mounted on the shaft for movement about a transverse axis and rotating with the shaft for loading the wheel when the wheel axis is concentric with the axis of the ring, a fixed counterweight balancing the centrifugal force of the loading weight when the wheel axis is concentric with the axis of the ring, the eccentricity of the loading weight increasing as the eccentricity of the wheel increases whereby the added centrifugal force of the loading weight over its centrifugal force at its minimum eccentricity serves to balance the centrifugal force of the wheel as its eccentricity increases.

26. A transmission according to claim 25 wherein said pivoted lever includes means operatively engaging the wheel at a point movable along a line substantially parallel to the axis of the wheel whereby the degree of loading of the wheel by the loading weight decreases as the wheel eccentricity increases.

References Cited in the file of this patent
UNITED STATES PATENTS

| 305,037 | Adams | Sept. 16, 1884 |
| 1,411,468 | Wood | Apr. 4, 1922 |
| 2,035,582 | Winger | Mar. 31, 1936 |
| 2,209,497 | Winger et al. | July 30, 1940 |
| 2,264,728 | Stillwagon | Dec. 2, 1941 |
| 2,868,039 | Lee | Jan. 13, 1959 |
| 2,948,165 | Luthi | Apr. 9, 1960 |
| 3,056,637 | Shanley et al. | Oct. 2, 1962 |

OTHER REFERENCES

"Enflo Teflon," published by Enflo Corp.

UNITED STATES PATENT OFFICE

CERTIFICATE OF CORRECTION

Patent No. 3,085,450 April 16, 1963

Louis A. Graham et al.

It is hereby certified that error appears in the above numbered patent requiring correction and that the said Letters Patent should read as corrected below.

Column 12, line 36, for the claim reference numeral "1" read -- 7 --; column 14, line 13, for "shatf" read -- shaft --.

Signed and sealed this 12th day of November 1963.

(SEAL)
Attest:

ERNEST W. SWIDER

Attesting Officer

EDWIN L. REYNOLDS

Acting Commissioner of Patents